United States Patent
Miyata et al.

(10) Patent No.: US 10,199,652 B2
(45) Date of Patent: Feb. 5, 2019

(54) BINDER FOR ELECTROCHEMICAL CELLS, PASTE FOR ELECTROCHEMICAL CELLS, AND METHOD FOR PRODUCING ELECTRODE FOR ELECTROCHEMICAL CELLS

(71) Applicant: MITSUI CHEMICALS, INC., Tokyo (JP)

(72) Inventors: Gen Miyata, Ichihara (JP); Yoshihiko Tomita, Ichihara (JP); Atsuko Tachibana, Ichihara (JP); Yu Iimuro, Ichihara (JP); Wengon Yah, Nagoya (JP)

(73) Assignee: MITSUI CHEMICALS, INC., Tokyo (JP)

( * ) Notice: Subject to any disclaimer, the term of this patent is extended or adjusted under 35 U.S.C. 154(b) by 228 days.

(21) Appl. No.: 15/100,913

(22) PCT Filed: Dec. 1, 2014

(86) PCT No.: PCT/JP2014/005981
§ 371 (c)(1),
(2) Date: Jun. 1, 2016

(87) PCT Pub. No.: WO2015/083358
PCT Pub. Date: Jun. 11, 2015

(65) Prior Publication Data
US 2016/0308215 A1 Oct. 20, 2016

(30) Foreign Application Priority Data
Dec. 2, 2013 (JP) .................. 2013-249190

(51) Int. Cl.
*H01M 4/13* (2010.01)
*H01M 4/139* (2010.01)
*H01M 4/04* (2006.01)
*H01M 4/62* (2006.01)
*H01M 10/0525* (2010.01)
*C08F 210/02* (2006.01)
*H01M 10/052* (2010.01)

(52) U.S. Cl.
CPC .......... *H01M 4/622* (2013.01); *C08F 210/02* (2013.01); *H01M 4/0404* (2013.01); *H01M 4/13* (2013.01); *H01M 4/139* (2013.01); *H01M 4/624* (2013.01); *H01M 4/625* (2013.01); *H01M 10/0525* (2013.01); *H01M 10/052* (2013.01)

(58) Field of Classification Search
CPC ...... H01M 4/0404; H01M 4/13; H01M 4/139; H01M 4/622; H01M 4/624; H01M 4/625; H01M 10/052; H01M 10/0525
See application file for complete search history.

(56) References Cited

U.S. PATENT DOCUMENTS

2007/0287064 A1* 12/2007 Suzuki .................. H01G 11/38
429/217
2012/0231337 A1 9/2012 Miyata et al.

FOREIGN PATENT DOCUMENTS

| CN | 101111957 A | 1/2008 |
|---|---|---|
| JP | H09-251856 A | 9/1997 |
| JP | 2008-066274 A | 3/2008 |
| JP | 2009-110883 A | 5/2009 |
| JP | 2010-189632 A | 9/2010 |

OTHER PUBLICATIONS

Extended European Search Report dated May 30, 2017 in corresponding European Patent Application No. 14868158.8.

* cited by examiner

Primary Examiner — Brittany L Raymond
(74) Attorney, Agent, or Firm — Foley & Lardner LLP

(57) ABSTRACT

The invention of the present application addresses the problem of providing a binder for electrochemical cells which exhibits sufficient adhesive properties with respect to collectors and active materials, which is electrochemically stable, which is not readily swelled by electrolytes, and with which battery cycle characteristic can be sufficiently improved. Accordingly, provided is a binder for electrochemical cells which comprises a polyolefin copolymer (A) including structural units derived from an olefin, and structural units derived from (meth)acrylic acid. The carboxylic acid included in the structural units derived from the (meth) acrylic acid is neutralized by at least one non-volatile alkali compound and at least one volatile alkali compound.

12 Claims, No Drawings

BINDER FOR ELECTROCHEMICAL CELLS, PASTE FOR ELECTROCHEMICAL CELLS, AND METHOD FOR PRODUCING ELECTRODE FOR ELECTROCHEMICAL CELLS

TECHNICAL FIELD

The present invention relates to a binder for use in an electrochemical cell electrode, an electrochemical cell paste, and a method for producing an electrochemical cell electrode using the same.

BACKGROUND ART

In electrodes for secondary batteries such as lithium-ion batteries, an active material is bound by a binder to a current collector of each of a positive electrode and a negative electrode. As the active material for the positive electrode of the lithium-ion batteries, transition metal oxides such as $LiCoO_2$ have been conventionally used. In recent years, from the viewpoints of economics and resource reserves, application of polyanion materials such as $LiFePO_4$ composed of lithium, a transition metal, and a phosphoric acid anion has also been taken into consideration. Further, from the viewpoint of low costs and availability of elemental components, active materials especially composed of $LiFePO_4$ is under development.

On the other hand, oxidation resistance is required for a binder for a positive electrode, and thus, conventionally, fluorine binders such as polyvinylidene fluoride (PVDF) and polytetrafluoroethylene (PTFE) have been frequently used. Further, for a binder for a negative electrode, polyvinylidene fluoride (PVDF) and styrene-butadiene rubber (SBR) have been frequently used.

Here, the fluorine binders have high oxidation resistance, but have low adherence to an active material and a current collector. Thus, a large amount of binder is necessary for binding the active material and the current collector together. However, when a large amount of binder is contained in a mixture layer, there is a problem such that the active material is more likely to be coated with the binder, thus causing the lowering of battery properties.

On the other hand, the above-mentioned SBR has high adherence to the active material and the current collector. Thus, even when there is less amount of binder, the active material is sufficiently bound. However, since affinity between SBR and the active material is too high, there is a problem such that the surface of the active material is more likely to be coated with SBR. Further, PVDF and SBR have high affinity to an electrolyte of a secondary battery. Thus, when a secondary battery is left standing at a high temperature or subjected to repetitive charging and discharging, there has also been a problem of battery expansion caused by swelling of the resin.

In order to solve such problems, it has been considered to employ, as a binder, an olefin copolymer which is electrochemically stable and which is less likely to swell even when immersed in an electrolyte (PTLs 1 and 2). An olefin copolymer binder is excellent in resistance to oxidation-reduction, undergoes less swelling by an electrolyte, and is less likely to coat an active material. However, since the adherence between an active material and a current collector is low, there is a problem such that satisfactory enhancement of cycle characteristic, which is one of the important characteristics of batteries, becomes difficult.

Further, it has also been considered to apply an aqueous dispersion containing acid-modified polyolefin resin to a current collector to obtain an electrode for a secondary battery (PTL 3). In this technique, however, an aqueous dispersion for forming a mixture layer contains an organic solvent. Thus, there has been a problem of a trace amount of the organic solvent being more likely to remain in a mixture layer, making irreversible capacity more likely to be increased. Moreover, from the viewpoint of environmental consideration (elimination of VOC (volatile organic compound)), less organic solvent is required to be contained in the aqueous dispersion.

Furthermore, PTL 4 proposes a binder composed of a neutralized ethylene-(meth)acrylic acid copolymer. In this technique, carboxylic acids contained in the ethylene-(meth)acrylic acid copolymer are neutralized with a volatile neutralizing agent (such as an amine) to prepare an aqueous dispersion of copolymers. Then, the aqueous dispersion is applied together with an active material to produce a mixture layer.

CITATION LIST

Patent Literature

PTL 1
Japanese Patent Application Laid-Open No. 9-251856
PTL 2
Japanese Patent Application Laid-Open No. 2009-110883
PTL 3
Japanese Patent Application Laid-Open No. 2010-189632
PTL 4
Japanese Patent Application Laid-Open No. 2008-66274

SUMMARY OF INVENTION

Technical Problem

As disclosed in the above-mentioned PTL 4, however, when the ethylene-(meth)acrylic acid copolymer is neutralized with a volatile neutralizing agent, carboxylic acids are not easily neutralized sufficiently, so that copolymers are more likely to sediment in the aqueous dispersion.

The present invention intends to solve the above-mentioned problems. Specifically, an object of the present invention is to provide: an electrochemical cell binder which has sufficient adherence to a current collector and an active material, is electrochemically stable and does not easily undergo swelling due to an electrolyte, and can sufficiently enhance the cycle characteristic of a non-aqueous electrolyte secondary battery; an electrochemical cell paste including the same; and the like.

Solution to Problem

That is, a first aspect of the present invention concerns an electrochemical cell binder as mentioned below.

[1] An electrochemical cell binder composed of a polyolefin copolymer (A), the polyolefin copolymer (A) including structural units derived from an olefin and structural units derived from a (meth)acrylic acid, in which carboxylic acids contained in the structural units derived from the (meth)acrylic acid are neutralized with at least one non-volatile alkali compound and at least one volatile alkali compound.

[2] The electrochemical cell binder according to [1], in which the polyolefin copolymer (A) is a compound obtained by neutralizing an olefin-(meth)acrylic acid copolymer with the non-volatile alkali compound and the volatile alkali compound, amounts of bases derived from the alkali compounds used for neutralizing the olefin-(meth)acrylic acid copolymer are 25 to 85 mol % for the non-volatile alkali compound, and 25 to 100 mol % for the volatile alkali compound based on a total amount of the carboxylic acids contained in the structural units derived from the (meth)acrylic acid.

[3] The electrochemical cell binder according to [1] or [2], in which the non-volatile alkali compound is at least one compound selected from the group consisting of lithium hydroxide, sodium hydroxide, potassium hydroxide, and non-volatile organic amines, and the volatile alkali compound is at least one compound selected from the group consisting of ammonia, and volatile organic amines.

[4] The electrochemical cell binder according to any one of [1] to [3], in which the polyolefin copolymer (A) is a neutralized ethylene-(meth)acrylic acid copolymer and has a weight-average molecular weight (in terms of polystyrene) of 50,000 or more as determined by gel permeation chromatography (GPC), and a percentage of the structural units derived from the (meth)acrylic acid, based on total amount of structural units of the ethylene-(meth)acrylic acid copolymer, is 5 wt % or more to 25 wt % or less.

A second aspect of the present invention concerns an electrochemical cell paste as mentioned below.

[5] An electrochemical cell paste containing the electrochemical cell binder according to any one of [1] to [4], a water-soluble polymer (B), an active material (C), and a conductive additive (D).

[6] The electrochemical cell paste according to [5], in which an amount of the electrochemical cell binder is 0.5 to 30 parts by weight, an amount of the water-soluble polymer (B) is 0.5 to 30 parts by weight, and an amount of the conductive additive (D) is 0.1 to 20 parts by weight, based on 100 parts by weight of the active material (C).

[7] The electrochemical cell paste according to [5] or [6], in which the water-soluble polymer (B) is at least one water-soluble polymer selected from the group consisting of carboxymethyl cellulose or a modified product thereof, polyethylene oxide or a modified product thereof, and polyvinyl alcohol or a modified product thereof.

[8] The electrochemical cell paste according to any one of [5] to [7], in which the conductive additive (D) contains conductive carbon or an organic semiconductor.

[9] The electrochemical cell paste according to any one of [5] to [8], in which the conductive additive (D) has a specific surface area of 2 to 80 m$^2$/g.

A third aspect of the present invention concerns an electrochemical cell electrode, a method for producing the same, and a non-aqueous electrolyte secondary battery, as mentioned below.

[10] A method for producing an electrochemical cell electrode including a current collector, and a mixture layer laminated on at least one surface of the current collector, the method including forming the mixture layer by applying the electrochemical cell paste according to any one of [5] to [9] to the at least one surface of the current collector.

[11] An electrochemical cell electrode including a current collector, and a mixture layer laminated on at least one surface of the current collector, in which the mixture layer is a cured product of the electrochemical cell paste according to any one of [5] to [9].

[12] The electrochemical cell electrode according to [11], in which the mixture layer has a bulk density of 1.0 to 6.0 g/cm$^3$.

[13] A non-aqueous electrolyte secondary battery including the electrochemical cell electrode according to [11] or [12].

Advantageous Effects of Invention

According to the electrochemical cell binder of the present invention, it is possible to provide a non-aqueous electrolyte secondary battery having a long charging/discharging cycle life and also being electrochemically stable.

DESCRIPTION OF EMBODIMENTS

1. Electrochemical Cell Binder

The electrochemical cell binder of the present invention is a material for a non-aqueous electrolyte secondary battery electrode. The non-aqueous electrolyte secondary battery electrode typically includes a current collector, and a mixture layer formed on one surface or both surfaces of the current collector and including an active material. The electrochemical cell binder is contained in the mixture layer together with the active material to function to bind the active material or the like to the current collector. The electrochemical cell binder of the present invention is applied to both a positive electrode and a negative electrode of the non-aqueous electrolyte secondary battery.

The electrochemical cell binder of the present invention is composed of a specific polyolefin copolymer (A) and is typically dispersed in water. Hereinafter, "electrochemical cell binder" is also referred to as "polyolefin copolymer (A)."

The polyolefin copolymer (A) of the present invention is preferably particle-shaped, and the volume-average particle diameter thereof is preferably 10 to 1,000 nm, more preferably 10 to 800 nm, and even more preferably 10 to 500 nm. When the volume-average particle diameter is 10 nm or more, the polyolefin copolymer (A) can bind the active material or the like to the current collector more easily. On the other hand, when the volume-average particle diameter is 1,000 nm or less, the water dispersibility of the polyolefin copolymer (A) is enhanced.

Further, the mixture layer is typically obtained by applying and drying an aqueous dispersion of the polyolefin copolymer (A); when the volume-average particle diameter of the polyolefin copolymer (A) is larger than 1,000 nm, the polyolefin copolymer (A) is more likely to move toward the coated surface of the aqueous dispersion together with water. As a result, the amount of the polyolefin copolymer (A) present at the interface between the mixture layer to be obtained and the current collector is decreased, so that the adherence to the mixture layer and the current collector is more likely to be lowered. The volume-average particle diameter of the polyolefin copolymer (A) is measured, for example, with a particle size distribution analyzer (e.g., Microtrack HRA: manufactured by Honeywell Co. Ltd.).

The polyolefin copolymer (A) of the present invention includes structural units derived from an olefin and structural units derived from a (meth)acrylic acid, and at least a part of the carboxylic acids included in the structural units derived from the (meth)acrylic acid has a structure neutralized with a specific alkali compound.

The structural units derived from an olefin included in the polyolefin copolymer (A) are structural units derived preferably from a $C_2$-$C_{18}$ linear, branched, or cyclic olefin, and more preferably from a $C_2$-$C_8$ linear or branched olefin. The polyolefin copolymer (A) may include either only one type of structural units derived from an olefin, or two or more types of structural units derived therefrom. The structural units derived from an olefin are preferably structural units derived from ethylene, propylene or butene, and are more preferably structural units derived from ethylene.

On the other hand, the structural units derived from a (meth)acrylic acid included in the polyolefin copolymer (A) may be structural units derived from acrylic acid or methacrylic acid; or structural units derived from substituted (meth)acrylic acids such as 3,3-dimethylacrylic acid and phenylacrylic acid. The polyolefin copolymer (A) may include two or more types of structural units derived from a (meth)acrylic acid. The structural units derived from the (meth)acrylic acid are structural units derived from particularly preferably acrylic acid or methacrylic acid.

The amount of the structural units derived from the (meth)acrylic acid is preferably 5 to 25 wt %, more preferably 6 to 20 wt %, and even more preferably 10 to 20 wt %, based on the total amount of the structural units included in the polyolefin copolymer (A). When the amounts of the structural units derived from the (meth)acrylic acid are less than 5 wt %, the dispersibility of the polyolefin copolymer (A) to water is more likely to be lowered. In addition, the adherence of the polyolefin copolymer (A) to the current collector and the active material is also more likely to be lowered. On the other hand, when the amounts of the structural units derived from the (meth)acrylic acid are more than 25 wt %, the polyolefin copolymer (A) is more likely to be dissolved in an aqueous medium. That is, the polyolefin copolymer (A) is more likely to be a water-soluble macromolecule, so that sometimes it may not be possible for the polyolefin copolymer (A) to bind the current collector and the active material sufficiently.

In the polyolefin copolymer (A) of the present invention, at least a part of the carboxylic acids included in the structural units derived from the (meth)acrylic acid is neutralized with at least one non-volatile alkali compound and at least one volatile alkali compound. In the carboxylic acid neutralized with each alkali compound, a hydrogen group in the carboxylic acid is substituted with a group derived from each alkali compound. Note that "non-volatile alkali compound" in the present invention is an alkali compound having a boiling point of 105° C. or higher, and "volatile alkali compound" is an alkali compound having a boiling point of less than 105° C.

As described above, in conventional electrochemical cell binders, carboxylic acids of an olefin-(meth)acrylic acid copolymer are neutralized only with a volatile alkali compound. However, there has been a problem of the olefin-(meth)acrylic acid copolymer being more likely to sediment when the carboxylic acids are neutralized only with the volatile alkali compound. The neutralization of the olefin-(meth)acrylic acid copolymer is typically performed by means of heating to a melting point of the copolymer or higher. Thus, it is deduced that the alkali compound is more likely to volatilize during the neutralization, resulting in insufficient neutralization of the carboxylic acids, causing the water dispersibility to be lowered.

On the other hand, there has been a problem of lowered adherence between a mixture layer containing the binder and the current collector when the carboxylic acids of an olefin-(meth)acrylic acid copolymer are neutralized only with a non-volatile alkali compound. The polyolefin copolymer (neutralized product) also contains unneutralized carboxylic acids; the unneutralized carboxylic acids are hydrogen-bonded to constituent materials of the current collector and the active material, to thereby allow the polyolefin copolymer to adhere to the active material and the current collector. However, the neutralization of the carboxylic acids with the non-volatile alkali compound cannot remove an excess alkali compound even with heating at the time of producing the mixture layer. As a result, an unreacted alkali compound remains in the mixture layer, so that the carboxylic acids are more likely to be neutralized excessively. That is, there is less amount of unneutralized carboxylic acids, so that sufficient amount of hydrogen bondings cannot be formed between the polyolefin copolymer and the current collector and between the polyolefin copolymer and the mixture layer. Therefore, it is deduced that the adherence between the current collector and the mixture layer is lowered.

Also in this case, in the aqueous dispersion of the polyolefin copolymer (neutralized product), the neutralized carboxylic acids are oriented at the interface with water, while the unneutralized carboxylic acids are present closer to the center of aqueous dispersion particles. Thus, the unneutralized carboxylic acids are not easily exposed to the surface of the polyolefin copolymer (neutralized product) particles, and thus the carboxylic acids cannot contribute to hydrogen bonding. It is deduced that this also constitutes one cause of lowered adherence between the mixture layer and the current collector.

In contrast, in the polyolefin copolymer (A) of the present invention, carboxylic acids are sufficiently neutralized with the non-volatile alkali compound and the volatile alkali compound, and thus the polyolefin copolymer (A) is highly dispersible in water. Further, a part of the carboxylic acids is neutralized with the volatile alkali compound. As described above, the carboxylic acids neutralized with an alkali compound are more likely to be oriented at the surface of polyolefin copolymer (A) particles. On the other hand, at least a part of the carboxylic acids neutralized with the volatile alkali compound returns to unneutralized carboxylic acids due to heating at the time of forming the mixture layer. That is, in the polyolefin copolymer (A) of the present invention, the unneutralized carboxylic acids are exposed to the surface of the particles at the time of forming the mixture layer. As a result, the polyolefin copolymer (A) can be hydrogen-bonded sufficiently to the mixture layer and the current collector, so that the adherence between the mixture layer and the current collector is enhanced, which leads to the enhancement of the cycle characteristic of non-electrolyte secondary batteries including the electrode.

The non-volatile alkali compound is not particularly limited as long as it is an alkali compound having a boiling point of 105° C. or higher. Examples thereof include: alkali metal hydroxides such as LiOH, NaOH, and KOH; and non-volatile organic amines such as monoethanolamine, diethanolamine, triethanolamine, ethylenediamine, 3-amino-1-propanol, 3-amino-2-propanol, 1-amino-2-propanol, 2-amino-1-butanol, N,N-dimethyl-2-aminoethanol, N,N-diethyl-2-aminoethanol, 2-amino-2-methyl-1-propanol, pyridine, aniline, morpholine, N-methylmorpholine, N-ethylmorpholine, N-methylimidazol, 2-amino-2-methyl-1,3-propanediol, and 2-amino-2-ethyl-1,3-propanediol. The above-mentioned non-volatile alkali compounds may be used singly or in combination for neutralizing the carboxylic acid.

The volatile alkali compound is not particularly limited as long as it is an alkali compound having a boiling point of less than 105° C. Examples thereof include: ammonia; and volatile organic amines such as methylamine, dimethylamine, trimethylamine, monoethylamine, diethylamine, triethylamine, and propylamine. The above-mentioned volatile alkali compounds may be used singly or in combination for neutralizing the olefin-(meth)acrylic acid.

Further, the weight-average molecular weight (in terms of polystyrene) of the polyolefin copolymer (A) measured by gel permeation chromatography (GPC) is preferably 50,000 or more, more preferably 50,000 to 200,000, and even more preferably 50,000 to 150,000. When the molecular weight of the polyolefin copolymer (A) is 50,000 or more, the particle diameter of the polyolefin copolymer (A) in an aqueous dispersion can be easily adjusted in a desired range.

The polyolefin copolymer (A) preferably has no melting point as measured with a differential scanning calorimeter (DSC), or has a melting point of 120° C. or lower, and more preferably 110° C. or lower. When no melting point is observed or the melting point is 120° C. or lower, the flexibility of the mixture layer containing the polyolefin copolymer (A) is more likely to be increased, so that the shrinkage stress at the time of forming the mixture layer is also more likely to be alleviated.

While the polyolefin copolymer (A) may have crystallinity, the degree of crystallization of the polyolefin copolymer (A) is preferably low from the viewpoint of enhanced cycle characteristic of a secondary battery as well as enhanced adherence between the active material and the current collector. Specifically, the degree of crystallization measured by X-ray diffraction method is preferably 30% or less.

The polyolefin copolymer (A) of the present invention is obtained by preparing an olefin-(meth)acrylic acid copolymer, and neutralizing the copolymer with a non-volatile alkali compound and a volatile alkali compound.

The method for preparing the olefin-(meth)acrylic acid copolymer is not particularly limited, and may be a conventionally known method. Examples thereof include a method in which an olefin and (meth)acrylic acid are copolymerized using a catalyst.

The method of neutralizing the olefin-(meth)acrylic acid copolymer may be a method in which the copolymer, water, the above-mentioned non-volatile alkali compound and the above-mentioned volatile alkali compound are mixed to allow the mixture to react while stirring the mixture at a predetermined temperature. During the neutralization of the olefin-(meth)acrylic acid copolymer, an auxiliary emulsifier may be added as necessary.

As for the amount of the non-volatile alkali compound to be added during the neutralization, the amount of bases (groups to be reacted with carboxylic acids) derived from the non-volatile alkali compound is preferably 25 to 85 mol % based on the total amount of carboxylic acids contained in the structural units derived from the (meth)acrylic acid. The amount of the bases derived from the non-volatile alkali compound is more preferably 30 to 80 mol %, and even more preferably 30 to 60 mol %. When the amount of the bases derived from the non-volatile alkali compound to be added during the neutralization is 25 mol % or more, the carboxylic acids are sufficiently neutralized with the non-volatile alkali compound. As a result, the dispersibility of the resultant polyolefin copolymer (A) in an aqueous medium is more likely to be enhanced. On the other hand, when the amount of the bases derived from the non-volatile alkali compound to be added during the neutralization is 85 mol % or less, the amount of unneutralized carboxylic acids is sufficient, relatively, so that the adherence of the resultant polyolefin copolymer (A) to the current collector and the active material is more likely to be enhanced.

On the other hand, as for the amount of the volatile alkali compound to be added during the neutralization, the amount of bases (groups to be reacted with carboxylic acids) derived from the volatile alkali compound is preferably 25 to 100 mol % based on the total amount of carboxylic acids contained in the structural units derived from the (meth)acrylic acid. The amount of the bases derived from the volatile alkali compound is more preferably 30 to 95 mol %, and even more preferably 35 to 90 mol %. When the amount of the volatile alkali compound to be added during the neutralization is within the above-mentioned range, unneutralized carboxylic acids are sufficiently generated in forming a mixture layer by applying and drying the dispersion of the resultant polyolefin copolymer (A). As a result, the adherence between the mixture layer and the current collector is more likely to be enhanced.

As for the ratio between the amount of the non-volatile alkali compound to be added and the amount of the volatile alkali compound to be added during the neutralization, the amount of the volatile alkali compound to 100 parts by mass of the non-volatile alkali compound is preferably 30 to 400 parts by mass, more preferably 50 to 390 parts by mass, and even more preferably 70 to 380 parts by mass.

The typical temperature during the neutralization reaction is preferably a temperature equal to or higher than the melting point of the olefin-(meth)acrylic acid copolymer; the temperature during the neutralization is preferably 105 to 180° C., and more preferably 120 to 170° C. Further, the reaction time is preferably 1 to 24 hours, and more preferably 2 to 8 hours. The volume-average particle diameter of the resultant polyolefin copolymer (A) is adjusted depending on the temperature during neutralization of the olefin-(meth)acrylic acid copolymer, the neutralized amount thereof, and the amount of the auxiliary emulsifier. Noted that the type of the auxiliary emulsifier to be added during the neutralization is not particularly limited, and it may be a known auxiliary emulsifier.

2. Electrochemical Cell Paste

The electrochemical cell paste is a paste for producing a mixture layer of an electrochemical cell electrode. The electrochemical cell paste contains the above-mentioned electrochemical cell binder (polyolefin copolymer (A)), a water-soluble polymer (B), an active material (C), and a conductive additive (D), and a solvent such as water may also be contained.

(2-1) Electrochemical Cell Binder ((Polyolefin Copolymer (A))

As described above, the electrochemical cell binder performs the function of binding the active material (C) and the conductive additive (D) to a current collector when producing a mixture layer of the electrochemical cell electrode on the current collector.

The electrochemical cell binder is contained in a solid content (all components except the solvent) of the electrochemical cell paste preferably at an amount of 1 to 10 wt %, and more preferably at an amount of 2 to 6 wt %. When the amount of the electrochemical cell binder contained in the solid content of the electrochemical cell paste is 1 wt % or more, the adherence between the mixture layer and the current collector is more likely to be enhanced. On the other hand, when the amount of the electrochemical cell binder is 10 wt % or less, the surface of the active material (C) is not easily coated with the electrochemical cell binder.

The content of the electrochemical cell binder is preferably 0.5 to 30 parts by weight, and more preferably 2 to 10 parts by weight based on 100 parts by weight of the active material (C). When the amount of the electrochemical cell binder contained is within the above-mentioned range, the electrochemical cell binder sufficiently binds the active material (C) to the current collector.

(2-2) Water-Soluble Polymer (B)

When the electrochemical cell paste contains the water-soluble polymer (B), the viscosity of the electrochemical cell paste is adjusted, so that the coatability of the electrochemical cell paste is enhanced. Further, the separation of the electrochemical cell binder, and the sedimentation of the active material (C) and the conductive additive (D) over time in the electrochemical cell paste are suppressed.

Examples of the water-soluble polymer (B) include cellulose or a modified product thereof such as carboxymethyl cellulose, carboxyethyl cellulose, or hydroxyethyl cellulose; polyethylene oxide or a modified product thereof; polyvinyl alcohol or a modified product thereof; and polysaccharides. Among those, carboxymethyl cellulose or a modified product thereof, polyethylene oxide or a modified product thereof, and polyvinyl alcohol or a modified product thereof are preferred, and carboxymethyl cellulose or a modified product thereof and polyvinyl alcohol or a modified product thereof are more preferable in terms of sedimentation stability. The electrochemical cell paste may contain either only one water-soluble polymer (B) or two or more water-soluble polymers (B).

From the viewpoint of easily suppressing the sedimentation of the active material (C) and the conductive additive (D) over time, the water-soluble polymer (B) is preferably carboxymethyl cellulose, polyoxyethylene or a modified product thereof, or polyvinyl alcohol or a modified product thereof.

While the molecular amount of the water-soluble polymer (B) is not particularly limited, the weight-average molecular weight (in terms of polystyrene) determined by gel permeation chromatography (GPC) is preferably 50,000 to 4,000,000, more preferably 60,000 to 3,500,000, and even more preferably 65,000 to 3,000,000. When the weight-average molecular weight of the water-soluble polymer (B) is less than 50,000, the active material (C) and the conductive additive (D) sometimes may sediment. On the other hand, when the weight-average molecular weight of the water-soluble polymer (B) is more than 4,000,000, the electrochemical cell paste sometimes may exhibit remarkable thixotropic properties, thus lowering the coatability of the electrochemical cell paste.

From the viewpoints of coatability and operability of the electrochemical cell paste, the content of the water-soluble polymer (B) based on 100 parts by weight of the polyolefin copolymer (A) is preferably 10 to 100 parts by weight, and more preferably 10 to 95 parts by weight.

Further, the content of the water-soluble polymer (B) based on 100 parts by weight of the active material (C) is preferably 0.5 to 30 parts by weight, and more preferably 0.5 to 20 parts by weight. When the content of the water-soluble polymer (B) in the active material (C) is within the above-mentioned range, the sediment of the active material (C) and the conductive additive (D) over time in the paste is more likely to be suppressed.

(2-3) Active Material (C)

The active material (C) contained in the electrochemical cell paste may be an active material for use in common non-aqueous electrolyte secondary batteries (lithium batteries). The type of the active material is appropriately selected depending on the use application (for positive electrode or negative electrode) of the electrochemical cell paste.

The active material for negative electrode is not particularly limited as long as the active material can be doped and dedoped with lithium ions, and examples thereof include metal lithium, a lithium alloy, tin oxide, niobium oxide, vanadium oxide, titanium oxide, silicon, a transition metal nitride, carbon materials such as natural graphite, and a composite thereof.

Examples of the active material for positive electrode include sulfur compounds such as $Li_2S$ and S; composite oxides of lithium and a transition metal such as $LiCoO_2$, $LiMnO_2$, $LiMn_2O_4$, $LiNiO_2$, $LiNi_xCo_{(1-x)}O_2$, $LiNi_xMn_yCo_{(1-x-y)}O_2$, $LiNi_xCo_yAl_{(1-x-3)}O_2$, and $Li_2MnO_3$; and phosphoric acid compounds such as $LiFePO_4$ and $LiMnPO_4$. The active material for positive electrode may also be coated with an electron conductive material such as a carbon material, in order to enhance the electron conductivity of the active material per se.

As for the particle size distribution of the active material (C), the median diameter (D50) measured by laser diffraction scattering method is preferably 0.5 to 20 μm. When D50 is less than 0.5 μm, the formation of the mixture layer becomes difficult due to the occurrence of reaggregation of particles in preparing the electrochemical cell paste. On the other hand, when D50 is more than 20 μm, the electron conductivity of particles per se cannot be easily achieved, so that the input and output performances of the non-aqueous electrolyte secondary battery are more likely to be lowered.

The BET specific surface area of the active material (C) is preferably 5 to 30 $m^2/g$. When the BET specific surface area is less than 5 $m^2/g$, the effective contact area between the active material (C) and the conductive additive (D) or the current collector becomes smaller, so that the resistance value of an electrode is increased. Thus, the input and output performances of the non-aqueous electrolyte secondary battery are more likely to be lowered. On the other hand, when the BET specific surface area is more than 30 $m^2/g$, a solvent is more likely to be adsorbed to the active material (C) in preparing the electrochemical cell paste. As a result, the solid content concentration of the paste is lowered, so that a crack is more likely to occur on the surface of the mixture layer.

(2-4) Conductive Additive (D)

The conductive additive (D) contained in the electrochemical cell paste may be conductive carbon, an organic semiconductor, metal powder, or metal fiber, with the conductive carbon or the organic semiconductor being preferred. Examples of the conductive carbon include acetylene black, ketjen black, carbon nanofiber, artificial graphite, and natural graphite. On the other hand, examples of the organic semiconductor include conductive high-molecular compounds such as polythiophene compound, polypyrrole compound, and polyaniline compound. The electrochemical cell paste may contain either only one of these conductive additives (D) or two or more thereof.

In particular, the conductive additive (D) for negative electrode is preferably artificial graphite powder. When the artificial graphite powder is employed as the conductive additive (D) for negative electrode, the energy density of the non-aqueous electrolyte secondary battery is more likely to be increased. On the other hand, the conductive additive (D) for positive electrode is preferably acetylene black from the viewpoint of cost or the like.

As for the particle size distribution of the conductive additive (D), the median diameter (D50) measured by laser diffraction scattering method is preferably 0.02 to 80 μm, and more preferably 0.4 to 20 μm. When D50 is less than 0.02 μm, the reaggregation of particles is more likely to occur in preparing the electrochemical cell paste. On the other hand, when D50 is more than 80 μm, a shearing force is not easily applied to the paste in preparing the electrochemical cell paste, so that the particles sometimes may be dispersed insufficiently. In particular, the conductive additive (D) for positive electrode such as acetylene black has a median diameter (D50) of preferably 0.02 to 5 μm, and more preferably 0.4 to 3 μm, from the viewpoint of balance with respect to the median diameter of the active material for positive electrode.

The specific surface area (BET) of the conductive additive (D) is preferably 2 to 80 $m^2/g$. When the specific surface area is less than 2 $m^2/g$, the effective contact area between the conductive additive (D) and the active material (C) or the current collector becomes smaller, and the resistance value of an electrode plate is increased, so that the input and output performances of the non-aqueous electrolyte secondary battery are more likely to be lowered. When the specific surface area of the conductive additive (D) is more than 80 $m^2/g$, the contact area between the conductive additive (D) and the non-aqueous electrolyte becomes larger, so that decomposition reactions of the non-aqueous electrolyte are more likely to occur frequently during charging.

The content of the conductive additive (D) based on 100 parts by weight of the active material (C) is preferably 0.1 to 20 parts by weight, and more preferably 0.2 to 15 parts by weight. When the content of the conductive additive (D) is within this range, favorable lithium ion transportation property and electric conductivity can be obtained without impairing the charging capacity. Further, when the amount of the conductive additive (D) is less than 0.1 part by weight, the electric conductivity of the mixture layer is more likely to be increased. On the other hand, when the amount of the conductive additive (D) is more than 20 parts by weight, Li ion transportation property sometimes may be lowered.

(2-5) Solvent

The electrochemical cell paste typically contains water and/or other solvents, particularly preferably contains only water. The amount and type of the solvent are appropriately selected depending on the viscosity of the electrochemical cell paste, or the like. Examples of the solvent other than water include $C_1$-$C_{10}$, preferably $C_2$-$C_4$ lower alcohols, such as methanol, ethanol, n-propanol, isopropanol, and n-butanol.

(2-6) Others

The electrochemical cell paste may contain, as necessary, various additives such as heat-resistant stabilizer, anti-slip agent, foaming agent, crystallization auxiliary agent, nucleating agent, pigment, dye, plasticizer, anti-aging agent, antioxidant, impact modifier, filler, cross-linking agent, co-cross-linking agent, cross-linking auxiliary, adhesive, softening agent, flame retardant, and processing auxiliary.

Further, the electrochemical cell paste may contain a surfactant, as necessary. When a surfactant is contained, the dispersibility of the active material (C) and the conductive additive (D) in the electrochemical cell paste is more likely to be enhanced. Examples of the surfactant include potassium oleate, a polyoxyethylene ether of an acetylenic glycol derivative, and silicon-modified polyoxyethylene ether. The electrochemical cell paste may contain either only one of these surfactants, or two or more thereof.

(2-7) Method for Preparing Electrochemical Cell Paste

The electrochemical cell paste is prepared by mixing the above-mentioned aqueous dispersion of electrochemical cell binder, water-soluble polymer (B), active material (C), and conductive additive (D) according to a known method. Additional solvents or other additives may be added, as necessary. Examples of the mixing method include stirring using a disper mixer.

The solid content concentration (concentration of components other than the solvent) of the electrochemical cell paste is preferably 20 to 80 wt %, and more preferably 30 to 70 wt %. When the solid content concentration of the electrochemical cell paste is 80 wt % or less, the coatability of the electrochemical cell paste is more likely to be enhanced. On the other hand, when the solid content concentration of the electrochemical cell paste is 20 wt % or more, the coating of the electrochemical cell paste is dried in a short period of time.

3. Electrochemical Cell Electrode

The electrochemical cell electrode of the present invention may be an electrode for a non-aqueous electrolyte secondary battery to be described later. The electrochemical cell electrode has a structure in which a mixture layer is laminated on one surface or on both surfaces of a current collector made of metal foil. Further, examples of the electrochemical cell electrode also include a so-called sheet-like electrode before being processed (e.g., cutting) for being disposed in the electrochemical cell.

(3-1) Current Collector

The current collector included in the electrochemical cell electrode is appropriately selected depending on, for example, the shape of an outer layer body of the non-aqueous electrolyte secondary battery, to which the electrochemical cell electrode is applied, and examples thereof include three-dimensionally connected metal porous bodies such as rolled metal foil, electrolytic metal foil, a porous metal plate, a lath-like metal porous body, punching metal, and a mesh-shaped or sponge-shaped metal porous body.

The current collector for positive electrode is made of preferably highly oxidation-resistant metal, and more preferably Al or Ti. On the other hand, the current collector for negative electrode is made of preferably metal which is hard to be alloyed with lithium, and more preferably Cu, Ni, SUS, or the like.

(3-2) Mixture Layer

The mixture layer contained in the electrochemical cell electrode is a cured product of the above-mentioned electrochemical cell paste.

The bulk density of the mixture layer for positive electrode is preferably 1.0 to 6.0 $g/cm^3$, and the amount of the active material (C) contained in the mixture layer for positive electrode is preferably 4 to 90 $mg/cm^2$. When the bulk density of the mixture layer is less than 1.0 $g/cm^3$, the energy density of the non-aqueous electrolyte secondary battery is more likely to be lowered. On the other hand, when the bulk density is more than 6.0 $g/cm^3$, the permeability of the electrolyte into a positive plate is lowered, so that the battery performance is more likely to be deteriorated. The bulk density is calculated by mixture layer weight (g)/mixture layer volume ($cm^3$). Further, the bulk density of the active material (C) contained in the mixture layer is calculated by mixture layer bulk density ($g/cm^3$)×the percentage of the active material contained in the mixture layer (%)/100.

On the other hand, the bulk density of the mixture layer for negative electrode is preferably 1.0 to 1.7 $g/cm^3$, and the amount of the active material (C) contained in the mixture layer for negative electrode is preferably 4 to 90 $mg/cm^2$.

The mixture layer is produced by applying the electrochemical cell paste onto the current collector, drying a solvent, and then rolling the applied coating.

The method of applying the electrochemical cell paste is not particularly limited, and may be a coating method using an applicator, bar coater, comma coater, die coater, or the like. Further, the method of drying the coating is not particularly limited, as long as a solvent contained in the paste can be dried, and the method may be drying at a normal temperature, heat drying, or the like. The temperature during drying is preferably 25 to 250° C., and more preferably 40 to 180° C. When drying at a temperature of equal to or higher than 25° C., a volatile alkali compound bonded to the electrochemical cell binder (polyolefin copolymer (A)) also volatilizes together with the solvent contained in the paste. As a result, unneutralized carboxylic acids are generated, and the electrochemical cell binder is hydrogen-bonded to the current collector, the active material (C) in the mixture layer, and the like. While the drying time is appropriately selected, typically the drying time is preferably less than 1 hour, and more preferably 0.1 to 30 minutes.

After the removal of the solvent in the paste and the volatile alkali compound, the coating is rolled, further. The rolling method is not particularly limited, and the rolling is performed using a roll press machine, or the like. The pressing pressure is appropriately selected such that the bulk density of the active material (C) in the mixture layer is in the above-mentioned range. When the coating is rolled, the adherence between the active material (C) and the conducting auxiliary agent (D), and the adherence between the conducting auxiliary agent (D) and the current collector are enhanced, so that the electric resistance of the electrochemical cell electrode is reduced.

4. Non-Aqueous Electrolyte Secondary Battery

The non-aqueous electrolyte secondary battery of the present invention may be a laminated body of a positive electrode, a separator, and a negative electrode disposed in a cylindrical, coin-shaped, rectangular, or film-shaped exterior material, with a non-aqueous electrolyte enclosed therein. The positive and negative electrodes of the non-aqueous electrolyte secondary battery may be the above-mentioned electrochemical cell electrodes.

(4-1) Separator

The separator for the non-aqueous electrolyte secondary battery is not particularly limited, and may be a non-woven fabric, microporous film, or the like, composed of polyethylene, polypropylene, polyester, polyimide, polyvinylidene fluoride, or the like.

The porosity of the separator is preferably 30 to 90%. When the porosity is low, the content of the non-aqueous electrolyte is more likely to be decreased, and the internal resistance of the non-aqueous electrolyte secondary battery is more likely to be increased. On the other hand, when the porosity is more than 90%, a positive electrode plate and a negative electrode plate are more likely to be brought into physical contact with each other, which sometimes may cause internal short-circuit of the non-aqueous electrolyte secondary battery.

The shape of the separator is appropriately selected in accordance with the shape of the non-aqueous electrolyte secondary battery, and typically the thickness of the separator is preferably 5 to 100 μm. When the thickness of the separator is 5 μm or more, the short-circuit between the positive and negative electrodes are sufficiently suppressed. On the other hand, when the thickness of the separator is 100 μm or less, the internal resistance of the non-aqueous electrolyte secondary battery is more likely to be suppressed.

(4-2) Non-Aqueous Electrolyte

The non-aqueous electrolyte may be obtained by dissolving an electrolyte salt in an organic solvent. Examples of the electrolyte salt contained in the non-aqueous electrolyte include lithium salts such as lithium borofluoride ($LiBF_4$), lithium hexafluorophosphate ($LiPF_6$), lithium trifluoromethanesulfonate ($LiCF_3SO_3$), lithium trifluoroacetate ($LiCF_3COO$), and lithium bis (trifluoromethanesulfone) imide ($LiN(CF_3SO_2)_2$). The non-aqueous electrolyte may contain either only one of these lithium salts or two or more thereof.

Examples of the organic solvent contained in the non-aqueous electrolyte include cyclic carbonates such as propylene carbonate, ethylene carbonate, and butylene carbonate; chain carbonates such as dimethyl carbonate (DMC), diethyl carbonate (DEC), ethyl methyl carbonate, and dipropyl carbonate; lactones such as γ-butyrolactone, and γ-valerolactone; furans such as tetrahydrofuran, and 2-methyltetrahydrofuran; ethers such as diethylether, 1,2-dimethoxyethane, 1,2-diethoxyethane, ethoxymethoxyethane, and dioxane; dimethyl sulfoxide, sulfolane, methyl sulfolane, acetonitrile, methyl formate, and methyl acetate. The non-aqueous electrolyte may contain either only one of these organic solvents or two or more thereof. Cyclic carbonates such as propylene carbonate, ethylene carbonate, and butylene carbonate are preferred from the viewpoint of high boiling point.

The concentration of the electrolyte salt in the non-aqueous electrolyte is preferably 0.5 to 3 mol/l. When the concentration of the electrolyte salt is 0.5 mol/l or less, the concentration of a carrier in the non-aqueous electrolyte is decreased, so that the resistance of the non-aqueous electrolyte is more likely to be increased. On the other hand, when the concentration of the electrolyte salt is more than 3 mol/l, the dissociation degree of the salt is decreased, so that the concentration of the carrier in the non-aqueous electrolyte is not easily increased.

(4-3) Exterior Material

The exterior material for the non-aqueous electrolyte secondary battery may be a can made of iron, stainless steel, aluminum or the like, or also may be a film-shaped bag of ultrathin aluminum laminated with a resin.

The shape of the exterior material is not particularly limited, and may be any shape of cylindrical, rectangular, thin, or other shapes. However, a large-sized lithium ion secondary battery preferably has a rectangular or thin shape, since it is often used as an assembled battery.

EXAMPLES

Hereinafter, the present invention will be described specifically with reference to Examples and Comparative Examples, but the present invention is not construed to be limited by these Examples.

Preparation of Aqueous Dispersion of Electrochemical Cell Binder (Polyolefin Copolymer (A))

Production Comparative Example 1

280 parts by weight of ethylene-methacrylic acid copolymer (weight-average molecular weight: 80,000 (in terms of polystyrene), content percentage of structural units derived from methacrylic acid: 20 wt %), 48.7 parts by weight of 25% aqueous ammonia solution (boiling point of ammonia: −33° C.), and 1,100 parts by weight of deionized water were charged into an autoclave, and the mixture was stirred at 150° C. for 4 hours. Upon cooling the liquid mixture, most of the ethylene-methacrylic acid copolymer precipitated without being emulsified.

Production Comparative Example 2

280 parts by weight of ethylene-methacrylic acid copolymer (weight-average molecular weight: 80,000 (in terms of polystyrene), content percentage of structural units derived from methacrylic acid: 20 wt %), 29.8 parts by weight of 96% sodium hydroxide (boiling point: 1,388° C.), and 1,100 parts by weight of deionized water were charged into an autoclave, and the mixture was stirred at 150° C. for 4 hours. The liquid mixture was cooled to obtain a milky white aqueous dispersion of polyolefin copolymer (A) (melting point: 85° C.) having a volume-average particle diameter of 20 nm and a solid content of 20%.

Production Comparative Example 3

280 parts by weight of ethylene-methacrylic acid copolymer (weight-average molecular weight: 80,000 (in terms of polystyrene), content percentage of structural units derived from methacrylic acid: 20 wt %), 13.5 parts by weight of 96% sodium hydroxide (boiling point: 1,388° C.), and 1,100 parts by weight of deionized water were charged into an autoclave, and the mixture was stirred at 150° C. for 4 hours. The liquid mixture was cooled to obtain a milky white aqueous dispersion of polyolefin copolymer (A) (melting point: 85° C.) having a volume-average particle diameter of 20 nm and a solid content of 20%.

Production Example 1

280 parts by weight of ethylene-methacrylic acid copolymer (weight-average molecular weight: 80,000 (in terms of polystyrene), content percentage of structural units derived from methacrylic acid: 20 wt %), 8.14 parts by weight of 96% sodium hydroxide (boiling point: 1,388° C.), 35.4 parts by weight of 25% aqueous ammonia solution (boiling point of ammonia: −33° C.), and 1,100 parts by weight of deionized water were charged into an autoclave, and the mixture was stirred at 150° C. for 4 hours. The liquid mixture was cooled to obtain a milky white aqueous dispersion of polyolefin copolymer (A) (melting point: 85° C.) having a volume-average particle diameter of 20 nm and a solid content of 20%.

Production Example 2

280 parts by weight of ethylene-methacrylic acid copolymer (weight-average molecular weight: 80,000 (in terms of polystyrene), content percentage of structural units derived from methacrylic acid: 20 wt %), 11.9 parts by weight of monoethanolamine (boiling point: 171° C.), 35.4 parts by weight of 25% aqueous ammonia solution (boiling point of ammonia: −33° C.), and 1,100 parts of deionized water were charged into an autoclave, and the mixture was stirred at 150° C. for 4 hours. The liquid mixture was cooled to obtain a milky white aqueous dispersion of polyolefin copolymer (A) (melting point: 85° C.) having a volume-average particle diameter of 20 nm and a solid content of 20%.

Production Example 3

280 parts by weight of ethylene-methacrylic acid copolymer (weight-average molecular weight: 80,000 (in terms of polystyrene), content percentage of structural units derived from methacrylic acid: 20 wt %), 8.14 parts by weight of 96% sodium hydroxide (boiling point: 1,388° C.), 38 parts by weight of diethylamine (boiling point: 55° C.), and 1,100 parts by weight of deionized water were charged into an autoclave, and the mixture was stirred at 150° C. for 4 hours. The liquid mixture was cooled to obtain a milky white aqueous dispersion of polyolefin copolymer (A) (melting point: 85° C.) having a volume-average particle diameter of 20 nm and a solid content of 20%.

Production of Electrochemical Cell Electrode (Positive Electrode)

Comparative Example 1

90 parts by weight of $LiCoO_2$ active material (manufactured by Aldrich Corporation), 4 parts by weight of acetylene black (Denka Black HS-100: manufactured by Denki Kagaku Kogyo K.K.), and a solution of polyvinylidene fluoride (PVDF) in N-methyl-2-pyrrolidone (PVDF amount: 6 parts by weight) were mixed to prepare electrochemical cell paste having a solid content concentration of 50 wt %.

The electrochemical cell paste was applied to one surface of aluminum foil (current collector) having a thickness of 20 μm, and dried. Thereafter, compression molding was performed to produce a positive electrode having a thickness of 70 μm composed of a current collector and a mixture layer.

Comparative Examples 2 to 4, and Examples 1 to 3

90 parts by weight of $LiCoO_2$ active material (manufactured by Aldrich Corporation), 4 parts by weight of acetylene black (Denka Black HS-100: manufactured by Denki Kagaku Kogyo K.K.), 1 part by weight of carboxymethyl cellulose (Daicel Chemical Industries, Ltd., CMC1160, weight-average molecular weight: 650,000), and each one of the aqueous dispersion of polyolefin copolymer (A) (polyolefin copolymer (A) amount: 4 parts by weight) prepared in Production Comparative Examples 1 to 3 and Production Examples 1 to 3 were mixed. Further, the solid content concentration was adjusted with deionized water to prepare electrochemical cell paste having a solid content concentration of 50 wt %.

The electrochemical cell paste was applied to one surface of aluminum foil (current collector) having a thickness of 20 μm, and dried. Thereafter, compression molding was performed to produce a positive electrode having a thickness of 70 μm composed of a current collector and a mixture layer.

<Evaluation of Electrochemical Cell Electrode (Positive Electrode)>

According to the following method, the electrochemical cell electrodes prepared in Comparative Examples 1 to 4 and Examples 1 to 3 were measured in terms of cutting strength to evaluate the adherence of the mixture layer to the current collector. The results are shown in Table 1.

(Method of Measuring Cutting Strength)

Each electrode was subjected to compression molding using a roll press machine to until the density becomes 3.0 g/cc, and the cutting strength was measured using Surface And Interfacial Cutting Analysis System (SAICAS: DN20 manufactured by Daipla Wintes Co., Ltd.).

TABLE 1

| | Electrochemical Cell Binder | | Adherence of Mixture Layer |
|---|---|---|---|
| | Type | Alkali Compound (Boiling Point) | (Cutting Strength) |
| Comp. Ex. 1 | PVDF | — | 0.32 kN/m |
| Comp. Ex. 2 | Ethylene-Methacrylic Acid Copolymer | Ammonia (−33° C.) | Impossible to Produce Electrode |

TABLE 1-continued

| | Electrochemical Cell Binder | | Adherence of Mixture Layer |
|---|---|---|---|
| | Type | Alkali Compound (Boiling Point) | (Cutting Strength) |
| Comp. Ex. 3 | Ethylene-Methacrylic Acid Copolymer | Sodium Hydroxide (1,388° C.) | Peeled off |
| Comp. Ex. 4 | Ethylene-Methacrylic Acid Copolymer | Sodium Hydroxide (1,388° C.) | 0.22 kN/m |
| Ex. 1 | Ethylene-Methacrylic Acid Copolymer | Sodium Hydroxide (1,388° C.) + Ammonia (−33° C.) | 0.34 kN/m |
| Ex. 2 | Ethylene-Methacrylic Acid Copolymer | Monoethanolamine (171° C.) + Ammonia (−33° C.) | 0.33 kN/m |
| Ex. 3 | Ethylene-Methacrylic Acid Copolymer | Sodium Hydroxide (1,388° C.) + Diethylamine (55° C.) | 0.32 kN/m |

As shown in Table 1, each of the electrodes having a mixture layer containing as a binder an ethylene-methacrylic acid copolymer neutralized with a volatile alkali compound and a non-volatile alkali compound showed excellent adherence (with the cutting strength of 0.32 kN/m or more) between the mixture layer and a current collector.

In contrast, when an ethylene-methacrylic acid copolymer neutralized only with a volatile alkali compound was used as a binder for a mixture layer, the mixture layer could not be formed (Comparative Example 2). Such a result is deduced to be the outcome of insufficient neutralization of an ethylene-methacrylic acid copolymer which caused the ethylene-methacrylic acid copolymer to sediment in the aqueous dispersion thereof.

On the other hand, when an ethylene-methacrylic acid copolymer neutralized only with a non-volatile alkali compound was used as a binder, the mixture layer was peeled off when a large amount of an alkali compound (sodium hydroxide) was used for neutralization (Comparative Example 3). Further, the adherence between the mixture layer and the current collector was lowered even when the amount of alkali compound used was decreased (Comparative Example 4). It is deduced that excessive non-volatile alkali compound undesirably remained in the mixture layer, causing carboxylic acids to be neutralized excessively.

<Production of Non-Aqueous Electrolyte Secondary Battery>

Production of Electrochemical Cell Electrode (Negative Electrode)

An aqueous solution of carboxymethyl cellulose (Daicel Chemical Industries, Ltd., CMC1160, weight-average molecular weight: 650,000) was provided. The concentration of carboxymethyl cellulose in the aqueous solution was set at 1.2 wt %

90 parts by weight of artificial graphite (product available from Hitachi Chemical Co., Ltd., average particle diameter: 20 μm), 7 parts by weight of acetylene black (Denka Black: manufactured by Denki Kagaku Kogyo K.K.), 83.3 parts by weight of the above-mentioned carboxy cellulose solution (amount of carboxy cellulose: 1 part by weight), and 41.7 parts by weight (solid content amount: 2 parts by weight) of an emulsion containing styrene-butadiene rubber (SR143: manufactured by Nippon A & L Inc., volume-average particle diameter: 160 nm, solid content concentration: 48 wt %) as a binder were mixed to prepare a negative electrode electrochemical cell paste having a solid content concentration of 50 wt %.

The negative electrode electrochemical cell paste was applied to one surface of the negative electrode current collector made of belt-shaped copper foil having a thickness of 18 μm, and dried. Then, compression molding was performed therefor to produce a negative electrode having a thickness of 70 μm.

Preparation of Non-Aqueous Electrolyte

A liquid mixture of ethylene carbonate (EC) and methylethyl carbonate (MEC) (EC:MEC=4:6 (weight ratio)) was provided as a non-aqueous solvent. $LiPF_6$ (electrolyte salt) was dissolved in this liquid mixture to prepare a non-aqueous electrolyte such that the concentration of the electrolyte salt was 1.0 mol/L.

Production of Coin-Type Lithium Ion Secondary Battery

As a negative electrode for a coin-type battery, the above-mentioned negative electrode was punched out in a disk shape with a diameter of 14 mm to obtain a coin-shaped negative electrode with a weight of 20 mg and a diameter of 14 mm. On the other hand, as a positive electrode for a coin-type battery, each of the above-mentioned positive electrodes of Comparative Examples 1 to 4 and Examples 1 to 3 was punched out in a disk shape with a diameter of 13.5 mm to obtain a coin-shaped positive electrode with a weight of 42 mg and a diameter of 13.5 mm.

The coin-shaped negative and positive electrodes and a separator having a thickness of 25 μm and a diameter of 16 mm made of a microporous polypropylene film were laminated in this order, and the laminated body was disposed in a negative electrode can of 2032-size battery can made of stainless steel. Thereafter, 0.04 ml of the above-mentioned non-aqueous electrolyte was injected into the separator. Then, a plate made of aluminum (1.2 mm in thickness, 16 mm in diameter) and a spring were stacked on the laminated body.

Lastly, the stacked body was covered with a positive electrode can of the battery with a polypropylene-made gasket being interposed therebetween, and was caulked with a can lid to maintain the airtightness inside the battery, thereby obtaining a coin-type battery having a diameter of 20 mm and a height of 3.2 mm.

<Evaluation of Battery Cycle Characteristic>

For each of the coin-type lithium ion secondary batteries, a cycle at 1 C was repeated 500 times to evaluate the capacity (%) after 500 cycles, relative to the initial battery capacity.

The evaluation results are shown in Table 2.

TABLE 2

| | Electrochemical Cell Binder | | |
|---|---|---|---|
| | Type | Alkali Compound (Boiling Point) | Capacity after 500 Cycles (%) |
| Comp. Ex. 1 | PVDF | — | 40% |
| Comp. Ex. 2 | Ethylene-Methacrylic Acid Copolymer | Ammonia (−33° C.) | Impossible to Produce Positive Electrode |
| Comp. Ex. 3 | Ethylene-Methacrylic Acid Copolymer | Sodium Hydroxide (1,388° C.) | 30% |
| Comp. Ex. 4 | Ethylene-Methacrylic Acid Copolymer | Sodium Hydroxide (1,388° C.) | 55% |
| Ex. 1 | Ethylene-Methacrylic Acid Copolymer | Sodium Hydroxide (1,388° C.) + Ammonia (−33° C.) | 86% |
| Ex. 2 | Ethylene-Methacrylic Acid Copolymer | Monoethanolamine (171° C.) + Ammonia (−33° C.) | 85% |

TABLE 2-continued

Electrochemical Cell Binder

| Type | | Alkali Compound (Boiling Point) | Capacity after 500 Cycles (%) |
|---|---|---|---|
| Ex. 3 | Ethylene-Methacrylic Acid Copolymer | Sodium Hydroxide (1,388° C.) + Diethylamine (55° C.) | 80% |

As shown in Table 2, in each lithium ion secondary battery of Examples 1 to 3 in which an ethylene-methacrylic acid copolymer neutralized with a non-volatile alkali compound and a volatile alkali compound was used as an electrochemical cell binder for the mixture layer, the percentage of decrease in the battery capacity after 500 cycles was 20% or less. Such a result is deduced to be the outcome of a firm binding between the mixture layer and the current collector.

In contrast, in lithium ion secondary battery of each of Comparative Examples 3 and 4 in which an ethylene-methacrylic acid copolymer neutralized only with a non-volatile alkali compound was used as a binder for the mixture layer, the percentage of decrease in the battery capacity after 500 cycles was 45% or less. Such a result is deduced to be the outcome of low adherence between the mixture layer and the current collector.

Also, in the lithium secondary battery of Comparative Example 1 which uses PVDF as an electrochemical cell binder, the percentage of decrease in the battery capacity after 500 cycles was 60%.

This application is a National Stage application of International Patent Application No. PCT/JP2014/005981, filed Dec. 1, 2014, which is entitled to and claims the benefit of Japanese Patent Application No. 2013-249190, filed on Dec. 2, 2013, the disclosures of which including the specification, drawings and abstract are incorporated herein by reference in their entireties.

INDUSTRIAL APPLICABILITY

A battery containing a mixture layer obtained by applying the electrochemical cell binder of the present invention has a long charging/discharging cycle life, and also is electrochemically stable. Therefore, the electrochemical cell binder can be applied to various secondary batteries.

The invention claimed is:

1. An electrochemical cell binder composed of a polyolefin copolymer (A), the polyolefin copolymer (A) comprising:
   structural units derived from an olefin, and
   structural units derived from a (meth)acrylic acid,
   wherein carboxylic acids contained in the structural units derived from the (meth)acrylic acid are neutralized with at least one non-volatile alkali compound having a boiling point of 105° C. or higher and at least one volatile alkali compound having a boiling point of less than 105° C.;
   wherein the polyolefin copolymer (A) is a compound obtained by neutralizing an olefin-(meth)acrylic acid copolymer with the non-volatile alkali compound and the volatile alkali compound;
   wherein amounts of bases derived from the alkali compounds used for neutralizing the olefin-(meth)acrylic acid copolymer are 25 to 85 mol % for the non-volatile alkali compound, and 30 to 95 mol % for the volatile alkali compound, each based on a total amount of the carboxylic acids contained in the structural units derived from the (meth)acrylic acid;
   wherein an amount of the volatile alkali compound added for neutralization is 30 to 486 parts by mass relative to 100 parts by mass of the non-volatile alkali compound added for neutralization;
   wherein a percentage of the structural units derived from the (meth)acrylic acid, based on a total amount of structural units of the polyolefin copolymer (A), is 5 wt % or more to 25 wt % or less.

2. The electrochemical cell binder according to claim 1, wherein
   the non-volatile alkali compound is at least one compound selected from the group consisting of lithium hydroxide, sodium hydroxide, potassium hydroxide, and non-volatile organic amines, and
   the volatile alkali compound is at least one compound selected from the group consisting of ammonia, and volatile organic amines.

3. The electrochemical cell binder according to claim 1, wherein
   the polyolefin copolymer (A) is a neutralized ethylene-(meth)acrylic acid copolymer and has a weight-average molecular weight (in terms of polystyrene) of 50,000 or more as determined by gel permeation chromatography (GPC).

4. An electrochemical cell paste comprising:
   the electrochemical cell binder according to claim 1;
   a water-soluble polymer (B);
   an active material (C); and
   a conductive additive (D).

5. The electrochemical cell paste according to claim 4, wherein
   an amount of the electrochemical cell binder is 0.5 to 30 parts by weight,
   an amount of the water-soluble polymer (B) is 0.5 to 30 parts by weight, and
   an amount of the conductive additive (D) is 0.1 to 20 parts by weight,
   based on 100 parts by weight of the active material (C).

6. The electrochemical cell paste according to claim 4, wherein the water-soluble polymer (B) is at least one water-soluble polymer selected from the group consisting of carboxymethyl cellulose or a modified product thereof, polyethylene oxide or a modified product thereof, and polyvinyl alcohol or a modified product thereof.

7. The electrochemical cell paste according to claim 4, wherein the conductive additive (D) contains conductive carbon or an organic semiconductor.

8. The electrochemical cell paste according to claim 4, wherein the conductive additive (D) has a specific surface area of 2 to 80 m$^2$/g.

9. A method for producing an electrochemical cell electrode comprising a current collector, and a mixture layer laminated on at least one surface of the current collector, the method comprising:
   forming the mixture layer by applying the electrochemical cell paste according to claim 4 to the at least one surface of the current collector.

10. An electrochemical cell electrode comprising a current collector, and a mixture layer laminated on at least one surface of the current collector, wherein
    the mixture layer is a cured product of the electrochemical cell paste according to claim 4.

11. The electrochemical cell electrode according to claim 10, wherein the mixture layer has a bulk density of 1.0 to 6.0 g/cm$^3$.

12. A non-aqueous electrolyte secondary battery comprising the electrochemical cell electrode according to claim 10.

* * * * *